Nov. 20, 1934.   W. R. ZIMMERMAN   1,981,407
SHUTTER
Filed Aug. 26, 1929   2 Sheets-Sheet 1
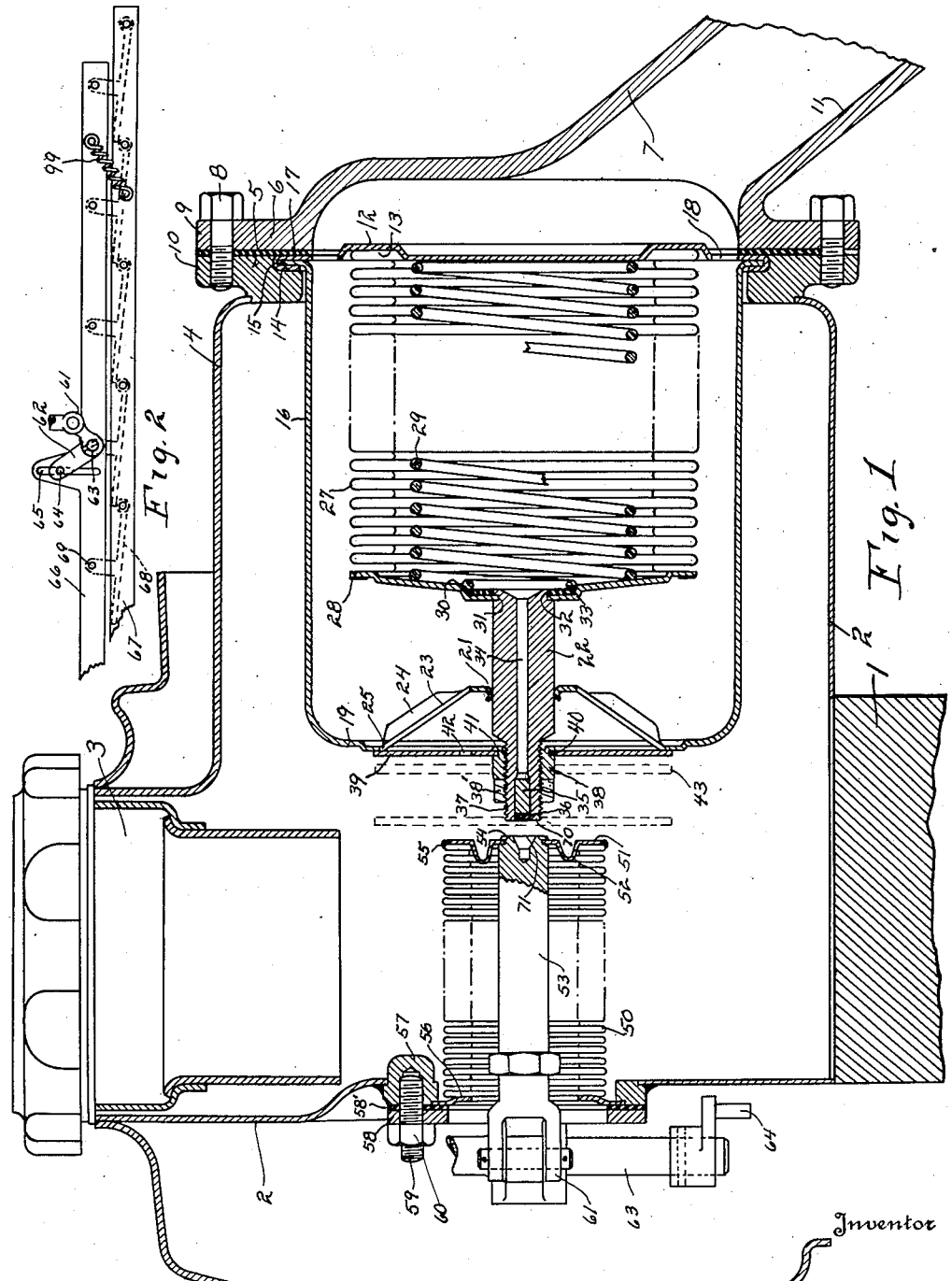
Inventor
William R. Zimmerman
By
Sloughand Canfield
Attorneys

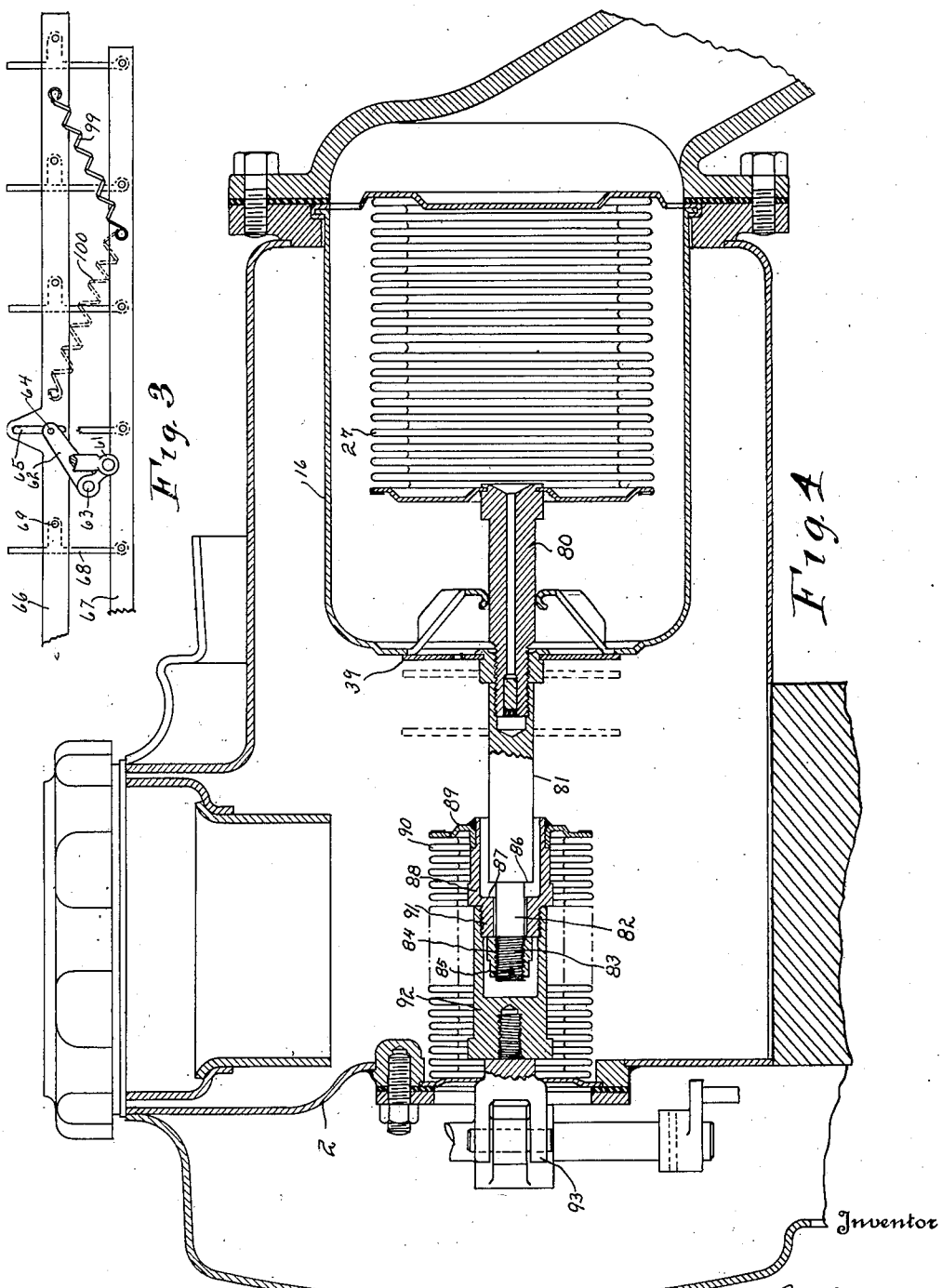

Patented Nov. 20, 1934

1,981,407

UNITED STATES PATENT OFFICE 1,981,407

SHUTTER

William R. Zimmerman, Cleveland, Ohio, assignor to The Bishop & Babcock Manufacturing Company, Cleveland, Ohio, a corporation of Ohio Application August 26, 1929, Serial No. 388,282

6 Claims. (Cl. 236—34)

My invention relates to temperature regulators and relates particularly to temperature regulators of a type which is particularly adaptable for the regulation of temperature by the cooling water for a water cooled internal combustion engine.

At the present time it is usual to effect a regulation of the temperature of the circulating cooling water employed in cooling an automotive internal combustion engine, by employing either thermostatic means to variably restrict the flow of the water in the circulation system, or to restrict the flow of cooling air through the cooling radiator employed as a part of such water circulation system by the thermostatic control of the operation of a plurality of shutters, which jointly form a valve, controlling the flow of air through the radiator.

It has been previously proposed to effect thermostatic regulation of both the flow of water through the circulation system and the flow of air through the radiator, forming a part of such system, and my present invention is particularly adapted for such a combined thermostatic controlling mechanism.

An object of my invention, therefore, is to effect in a very efficient manner, both the control of the flow of water through a water cooling system for an internal combustion engine, and the flow of air through a radiator forming a part of the system.

Another object of my invention is to provide an improved thermostatically controlled mechanism for operating air flow controlling shutters of an automotive engine radiator in a manner involving the advantageous disposition of the thermostat element within the radiator casing and to communicate controlling movements of said thermostat to air flow controlling shutters in a highly advantageous manner.

Another object of my invention is to accomplish any or all of the foregoing objects in a mechanism wherein a thermostat element is advantageously disposed within an automotive radiator tank being removable through a rear wall thereof and adapted to transmit radiator shutter operating movement through an opposite forward wall thereof.

Another object of my invention is to provide a thermostatically operated mechanism adapted to efficiently transmit controlling movements effected by a thermostat disposed within a radiator shell through a front wall of the shell to a series of shutters disposed in front of the radiator without the use of packings, glands, or the like, for preventing the loss of water through said wall.

Another object of my invention is to provide a thermostatic controlling mechanism for the cooling water flow and the flow of air in different paths through a radiator core in a highly efficient manner.

Another object of my invention is to provide a thermostatic controlling mechanism for the cooling water flow and the flow of air in different paths through a radiator core in such a way that upon an increase of temperature of the water in the system, the water flow controlling valve will first be operated and then the shutters controlling the air flow will be subsequently operated, subsequent closure of the shutters and the water flow valve being effected in reverse order.

Another object of my invention is to provide an inexpensive, easily installed mechanism, efficiently operative and accomplishing any of the aforesaid objects.

Another object of my invention is to provide a system of the above type wherein failure of the thermostatic element of the mechanism will effect movement of the temperature controlling parts to a "safety" position.

Other objects of my invention and the invention itself will become apparent by reference to the following description of certain embodiments of my invention, and to the drawings illustrating the said embodiments, which are illustrated as being applied to the upper water receiving tank of an automobile radiator of the type commonly employed for air-cooling the water which is circulated therethrough from and to the water jacket of the automotive internal combustion engine.

Referring to the drawings:

Fig. 1 illustrates an embodiment of my invention in longitudinal medial sectional view, the immediately adjacent parts of an automobile radiator cooling tank and shutter housing being framgentarily indicated.

Figs. 2 and 3 are plan views of the shutter operating and retractive means employed in connection with the mechanism of Fig. 1; Fig. 2 showing the means in the relative positions assumed when the radiator shutters are closed, and Fig. 3 illustrating the parts in the relative positions assumed when the radiator shutters are opened.

Fig. 4 illustrates a second embodiment of my invention operable in connection with the same kind of means as illustrated in Figs. 2 and 3, the view being similar to that of Fig. 1.

Referring to Fig. 1, I have shown the upper portion only of an automobile radiator, illustrating a portion of the radiator core at 1, and the superimposed radiator tank 2, the latter having a filler neck opening 3. The tank is provided with a rearward chamber 4 terminating in an annulus 5. To the annulus the flange 6 of an inlet water coupling 7 is bolted by bolts 8 fastened through registering lugs 9 and 10 on the annulus 5 and flange 6, respectively; and the coupling terminates in a pipe portion 11 to which a hose adapted to conduct water from the engine water jacket may be secured in the usual manner. A thermostat unit is mounted in the chamber 4 and will now be described.

An end plate 12 of disk form, provided with an annular depression 13 has its outer periphery spun over as at 14 to sealedly clamp therein the outwardly directed annular flange 15 of a generally tubular thermostat housing 16. The turned or spun over annular flange 14 thus provided is clamped between the annulus 5 and the flange 6 and by means of a gasket 17, when the bolts 8 are pulled up tight the housing 16 including the plate will not only be rigidly supported in the chamber 4 but will be sealed water tight therein. The plate 12 is provided with a plurality of apertures of passages 18 through which water may flow. The other end of the housing 16 is depressed inwardly axially as at 19 and provided with a turned over or beaded aperture 21 to serve as a guide to guide the axial movement therein of a thermostat stem 22 to be described. The sloping generally conical walls 23 of the housing end thus provided is perforated by bending inwardly lips 24, thus providing passage ways for the water and stiffening ribs. The extreme end (left in Fig. 1) of the housing 16, thus has a large circular port 25 adapted to be opened and closed by the axial movement (left or right, respectively) of a valve 39, adapted to engage the periphery of the port 25 as a seat.

In the housing 16 is provided a longitudinally expansible and contractible bellows 27 one end of which is mounted in and secured, as by solder in the annular depression 13 of the plate 12. The other end of the bellows is similarly secured to a bellows head 28. Within the bellows there is preferably provided an axially expansible compression spring 29, abutting at its opposite ends respectively upon the inner faces of the plate 12 and the head 28. The spring 29 may be centered in the bellows by means of a convolution of relatively small diameter seated in a depression 30 in the head 28. At the center of the head 28 a thermostat stem 22 is secured and sealed, and for this purpose a perforation 31 is provided in the head and the stem is correspondingly turned down to be passed through the perforation and is then spun over as at 32 to grip the edges of the perforation. To seal the connection thus made, solder as at 33 may be applied. The stem 22 has a central bore 34 adapted to be sealed at its outer end by a plug 35 and solder 36 and by this construction the bellows 27 may be exhausted to a predetermined degree of vacuum and a heat expansible medium may be introduced into the bellows 27.

The free end (left in Fig. 1) of the stem 22 is turned down and threaded as at 37 to receive a threaded nut 38 upon which is mounted a disk shaped valve 39, by means of a perforation 40 in the valve through which a reduced portion of the nut extends and is spun over as at 41. A lock nut 38' secures the nut 38 from rotation. The valve has a minimum flow perforation 42.

From the description thus far given, it will now be understood that water from the engine flowing through the pipe 11 through the apertures 18 may flow through the ports 23 and through the minimum flow port 42 to the engine radiator.

The pressure of the water upon the head 28, the vacuum in the bellows 27 and the spring 29 jointly give a resultant inwardly axial pull on the stem 22 to hold the valve 39 on the valve seat 25 to hold the valve port 25 closed, and to permit the water to flow at a very slow minimum rate through the port 42. The pressure at which the valve 39 holds the port 25 closed may be adjusted by screwing the nut 38 back and forth on the thread 37 as will be understood.

Upon a rise of temperature of the water due to the slow circulation just described, the pull on the stem 22 will decrease, due to the thermal expansion of the medium within the bellows 27 and at a predetermined high temperature, the bellows will expand longitudinally, the stem 22 will move outwardly through the aperture 21 and carry the valve 39 to some position such as the dotted position 43, thus opening the port 25 and increasing the water flow and on a continual rise of temperature the valve will open still farther as will be understood to further increase the circulation through the cooling radiator. The valve will conversely move toward or into the closed position if the temperature of the water falls, and thus a substantially constant water temperature is thus attained which may be predetermined to be the efficient operating temperature for the engine.

When the valve 39 has moved to the position 43, if the increase of circulation occasioned thereby has not checked the rise of temperature, further movement of the stem 22 will bring into action the shutter opening mechanism to open it gradually in accordance with further rise of temperature. A second bellows 50 preferably smaller than the bellows 27 is closed and sealed at the inner end by a plate 51 soldered thereto, provided with an inwardly directed annular bead 52 to center bellows thereon; a connecting rod 53 is connected to and sealed in a central perforation 54 in the plate 52 by inserting the end of the rod therethrough and spinning it over and by means of an annular filler of solder 55.

The other end of the bellows 50 is open and is supported by means of an annular head 56 soldered to the end of the bellows and clamped between an annulus 57 and a clamp ring 58. Studs 59 in the annulus 57 carry nuts 60 by which the clamping pressure is supplied. A gasket 58' is preferably employed between the annulus and clamp ring. Thus, the opening of the bellows 50 is supported with a leak proof connection on the tank 2 of the radiator.

The connecting rod 53 terminates outwardly in a fork 61 pinned to a bell crank 62, connected to a shutter operating shaft 63, see Figs. 2 and 3. On the bell crank is a trunnion 64 adapted to engage and slide in a slot 65 connected to the shutter rail 66. The shutter rail 66 may thus be reciprocated longitudinally by oscillation of the shaft 63 on its axis in a manner to be described. Another and stationary shutter rail 67 has pivoted or hinged thereto shutter vanes 68—68, and these vanes are also connected as by pins 69 to the rail 66. Movement of the shutter rail 66 in one direction, to the left in Figs. 2 and 3 will move the shutter vane 68 to closed position and movement of the rail in the other direction will open them. A spring 99 connecting the rails 66 and 67 tends to pull them into their closed position, Fig. 2.

The shutter mechanism has been indicated somewhat diagrammatically in the drawings, since the exact form and construction thereof may be greatly varied and the details thereof form no essential part of my invention. The bearings and supports for the shaft 63 and the shutter rails 66 and 67 have been omitted for simplicity. The drawings and description thereof, however, are deemed sufficient to show the opening and closing of the radiator shutter upon longitudinal movement of the connecting rod 53 above described.

It will now be apparent that the connecting rod 53 from which the movement to actuate the shutter wherever their form of construction is derived, is effected as follows: When the thermostatic unit has moved the valve 39 to the position 43, further movement of the stem 22 will bring its outer end 70 into engagement with the adjacent end 71 of the connecting rod 53 and further movement of the stem 22 will propel the rod 53, longitudinally toward the left in Fig. 1 and thereby operate the shutters to open them by means of the mechanism hereinbefore described or any other suitable mechanism.

In operation, when the engine is cold, the valve 37 and the shutters 68 will be closed. When the engine is started they will remain closed until the engine and the slowly circulating water have heated up to the efficient operating temperature of the engine, the circulation being limited by the minimum flow port 42. Upon a further rise of temperature, the bellows 27 will expand and open the valve 39 increasing the flow of water to the cooling radiator. If this does not check the rise of temperature, the valve 39 will be opened farther and farther. If the temperature falls, the valve 39 will move toward the closed position. If the water temperature rises beyond the regulating capacity of the valve 39, the stem 22 will be moved far enough to engage the end of the conncting rod 53 and move it to actuate the shutter mechanism to open the shutters with a gradual and regulating movement. When the engine is shut down and the water begins to cool, the operation is reversed, the bellows 27 contracting and permitting the shutters to close and finally closing the valve 39, thus practically shutting off circulation of the water through the radiator.

The force exerted by water pressure inside the housing 16 upon the valve 39 is in the direction to open it, the force being maximum in the valve closed position and diminishing as the valve opens.

Upon failure of the thermostatic bellows 27, due to any cause, such as cracking or puncturing, its vacuum will be destroyed, and thereupon the spring 29 in the bellows will expand freely and aided by water pressure will move the stem 22 to open the valve 39 and open the shutters and hold them open, as above described, so that the circulating system may function to keep the water cool in the usual manner. To this end, the spring 29 is preferably made strong enough to overpower the spring 99.

In Fig. 4, taken in connection with Figs. 2 and 3, is illustrated another embodiment of my invention which is generally like that of the embodiment just described except that communication of motion from the thermostatic bellows to the shutters is effected through parts somewhat differently constructed and arranged.

In Fig. 4, the valve stem 80, instead of the lock nut 38' of Fig. 1, has a connecting rod 81 screw threaded onto the threaded end of the stem, and having a reduced opposite end 82 which terminates in an externally threaded end portion 83 to which a nut 84 is secured and non-rotatably held by a pin 85.

The reduction of the rod provides a shoulder 86 adapted to engage an annular end wall 87 of a flanged cup shaped element 88, which is slidably retained on the reduced portion 82 of the connecting rod by the nut 84. An annular radial flange 89 is secured to the rim at the other end of the element 88 and makes a sealed joint with an end of a bellows 90, which may be constructed similarly to the bellows 50 of Fig. 1. The opposite end of the bellows 90 may be secured to the radiator tank 2 by the same construction as shown in Fig. 1.

The element 88 is provided with a reduced externally threaded stem 91 on which a push rod 92 is screw threaded and which carries at its outer end a fork or clevis 93 which projects forwardly of the tank wall 2.

The fork 93 is connected to a shutter, as in Figs. 2 and 3 by parts which may be the same as those described for the other embodiment. The operation of the embodiment of Figs. 4, 2 and 3 is similar to that of Figs. 1, 2 and 3 with the exception that the thermostat by the expansion and contraction of the bellows 27 both opens and closes the shutters. Upon expansion of the bellows 27, the stem 80 and its extension 81 have a free valve regulating movement for a limited amount until the shoulder 86 engages the element 88 thereafter further movement will propel the rod 92 and open the shutters; and correspondingly, when the bellows 27 contracts, reverse movement of the extension 81 will bring the nut 84 into engagement with the element 88 and reversely propel the rod 92 to close the shutters.

In connection with the embodiment in Fig. 4, the shutters may be constrained by a spring to normally open, such for example, as the spring indicated in broken lines at 100 in Fig. 3. The collapsing force of the bellows 27 will be sufficient to overcome the spring 100 and close the shutters in the normal operation thereof, and upon failure of the bellows as by puncturing and the loss of its vacuum, the spring 100 will open the shutters which, as explained in connection with Fig. 1, permits the water to circulate in the system in the usual manner to prevent overheating of the engine. Independently of the spring 100, the water pressure in the casing 16 on the valve 39 may similarly open the shutters.

I have thus provided a shutter mechanism which as described is operated directly through the radiator, eliminating usual extraneous means for operating shutters, and one which dispenses with the usual packing glands which tend to leak, and a thermostat which may be easily and readily removed from the radiator for repairs or replacement.

Having thus described my invention in a preferred embodiment, I am aware that numerous and extensive departures may be made from the embodiment herein illustrated and described but without departing from the spirit of my invention.

I claim:

1. In combination with a cooling water circulating system of an internal combustion engine comprising a radiator, a tank supplying water to an upper portion of the radiator for flow downwardly therethrough, and a conduit connection from the engine water jacket to the tank, a discharge orifice from the conduit in a wall of the tank, a chamber in the tank having side walls sealed to peripheral portions of the orifice, a thermostat in the chamber, a valve port in a chamber wall for discharging water from the chamber into the tank, a valve for the port movable by the thermostat to be opened amounts commensurable with temperature of water in the chamber above a predetermined value, a restricted orifice in the valve to permit a predetermined minimum of flow therethrough into the tank, a radiator shutter, a movable shutter operating element extending outwardly through a wall of the tank, and within the tank disposed to be engaged and moved to open the shutter by means associated with the valve only after a predetermined port opening movement of the valve, said thermostat being of bellows form and being provided with a longitudinally extending thermally movable stem supporting the valve, and the shutter operating element extending inwardly of the tank through a sealed aperture therein and, inwardly of the tank, having telescopic engagement with the stem permitting limited relative longitudinal movement whereby the stem and the stem end of the thermostat may be supported and the movement thereof guided.

2. In combination with a shutter controlled radiator construction of an internal combustion engine, a walled housing supported on the radiator, a thermostat in the housing comprising a thermally movable member, a valve port in a wall of the housing, a valve construction comprising a valve normally closing the port connected to the thermostat movable member and outwardly movable therewith to open the port, a shutter operating element supported on the radiator disposed with a portion thereof adjacent the valve construction and spaced therefrom in the direction of valve movement and engageable and movable in the direction to open the shutter, by a portion of the valve construction after a predetermined valve movement in the valve opening direction.

3. The combination described in claim 2 and in which the thermostat is of bellows type and the movable member is a stem construction connected at one end to the bellows and at an intermediate portion to the valve and extends outwardly from the valve, and the portion of the shutter operating element is disposed in spaced relation to an end portion of the stem construction and engageable and movable by thermally effected longitudinal movement of the stem construction.

4. The combination described in claim 2 and in which the thermostat is of bellows type and the movable member is a stem construction connected at one end to the bellows and at an intermediate portion to the valve and extending outwardly from the valve, and the portion of the shutter operating element is telescoped with an end portion of the stem construction, and shoulder means on the stem construction and shutter operating element are engageable to move the shutter operating element to open the shutter after a predetermined thermally effected movement of the valve and stem construction.

5. In combination with a shutter controlled radiator construction of an internal combustion engine, a walled housing supported on the radiator, a thermostat in the housing comprising a thermally movable member, a valve port in a wall of the housing, a valve construction comprising a valve normally closing the port connected to the thermostat movable member and movable therewith to open the port, a shutter operating element disposed with a portion thereof adjacent the valve construction and spaced therefrom and movable to open the shutter by a portion of the valve construction after a predetermined valve movement in the valve opening direction.

6. In combination with a cooling water circulating system of an internal combustion engine comprising a radiator, a tank supplying water to the radiator, and a conduit connection from the engine water jacket to the tank, a discharge orifice from the conduit in a wall of the tank, a chamber in the tank having side walls sealedly connected to peripheral portions of the orifice, a thermostat in the chamber, a valve port in a chamber wall for discharging water from the chamber into the tank, a valve for the port movable by the thermostat to be opened amounts commensurable with temperature of water in the chamber above a predetermined value, a radiator shutter, a movable shutter operating element extending outwardly through a wall of the tank, and within the tank disposed to be engaged and moved to open the shutter by means associated with the valve only after a predetermined port-opening movement of the valve, said thermostat being provided with a longitudinally extending thermally movable stem connected to the valve, and the shutter operating element extending inwardly of the tank through a sealed aperture therein and inwardly of the tank having telescopic engagement with the stem permitting limited relative longitudinal movement, whereby the stem may be supported and the movement thereof guided.

WILLIAM R. ZIMMERMAN.